SYSTEM FOR DEMODULATING LOW-LEVEL FREQUENCY MODULATED SIGNALS UTILIZING A SHORT TERM SPECTRAL ANALYZER
Filed March 13, 1963 5 Sheets-Sheet 1

Nov. 9, 1965 G. P. A. BATTAIL ETAL 3,217,262

SYSTEM FOR DEMODULATING LOW-LEVEL FREQUENCY MODULATED SIGNALS UTILIZING A SHORT TERM SPECTRAL ANALYZER

Filed March 13, 1963 5 Sheets-Sheet 3

United States Patent Office 3,217,262

Patented Nov. 9, 1965

3,217,262
SYSTEM FOR DEMODULATING LOW-LEVEL FREQUENCY MODULATED SIGNALS UTILIZING A SHORT TERM SPECTRAL ANALYZER

Gérard Pierre Adolphe Battail, 30 Blvd. du Temple, Paris 11, France, and Pierre Claude Brossard, Boulogne-sur-Seine, France (9 Rue des Fleurs, Montigny-le-Bretonneux par Trappes, France)

Filed Mar. 13, 1963, Ser. No. 264,864
Claims priority, application France, Apr. 9, 1962, 893,755
16 Claims. (Cl. 329—110)

This invention relates to a new demodulator for low-power frequency modulated waves, permitting an appreciable improvement in the "reception threshold," i.e. the minimum input signal level compatible with an acceptable output signal-to-noise ratio.

Most hitherto known devices used for the demodulation of frequency modulated waves comprise either a limiter followed by a discriminator or a device which counts the number of zero crossings per unit time of the received wave. In both cases, a "threshold effect" is apparent if the signal-to-noise ratio at the demodulator input falls below 10 to 12 decibels. In other words, the signal-to-noise ratio after demodulation very rapidly deteriorates when the signal-to-noise ratio at the demodulator input falls below this threshold value.

Numerous proposals for improved demodulators have been made with a view to reducing the said threshold value. For instance, reference can be made in this respect to the article by E. J. Baghdady entitled, "A Comparison of F.M. Demodulation Methods," published in the book "Advance in Astronautical Sciences," volume 6, pages 3 to 25, edited by McMillan & Co., New York, 1961. As this article goes to show, many known demodulators comprise a feedback loop arrangement including a frequency-changer (or modulator) hereinafter designated, for short, as a "mixer," which receives at one of its inputs the signal which is to be demodulated and at the other an "estimated" signal derived from the output of said mixer which, after filtering, frequency demodulation and modification in a correcting network, is caused to frequency-modulate a local oscillator, the output of which constitutes this estimated signal. By suitable adjustment of the modulation index and mean frequency of the local osciallator, with due regard to those of the input signals to be demodulated, a frequency bandwidth compression takes place, resulting in an improvement of the signal-to-noise ratio of the demodulated signals, at least if certain conditions are fulfilled. Full advantage of such frequency compression is taken by inserting a comparatively narrow-band filter network between the mixer output and the frequency demodulator included in the feedback loop.

More detailed studies of the same process have been published by E. J. Baghdady in the U.S. review "I.R.E. Transactions on Communications Systems," vol. CS-10, No. 3, September 1962, pages 226–245, in a paper entitled, "The Theory of F.M. Demodulation With Frequency-compressive Feedback," and also by C. L. Ruthroff and W. F. Bodtmann in another paper entitled, "Design and Performance of a Broad-band F.M. Demodulator With Frequency Compression," published in the U.S. review "Proceedings of the I.R.E.," vol. 50, No. 12, December 1962, pages 2436 to 2445.

The various cited authors agree on the fact that the main factor which limits the performance of the described systems is the phase shift in the feedback loop, which should be kept to a minimum value for the best results. However, it is not possible in practice to reduce this phase shift below a certain value, substantially higher than that which would be unconditionally imposed by stability criteria. The mechanism by which the existence of the said phase shift (or delay) tends to decrease the signal-to-noise ratio of the demodulated signals will be considered in greater detail later on.

It is clear that if, in a feedback frequency compression system, the demodulation products were caused to directly remodulate the local oscillator and subsequently fed into the mixer, the signal so applied to the second input of this mixer would be constituted by the estimated value not of the signal $S(t)$ at instant $t$ to be demodulated but of the signal $S(t-\Delta t)$ which was being demodulated at a previous instant $(t-\Delta t)$, the time $\Delta t$ being the time taken by the mixed signals to pass through the demodulating arrangement, to remodulate the local oscillator and to reach the mixer. This would mean that the signal $S(t)$ injected into the demodulator would not be mixed with its corresponding estimated value $S_1(t)$, but at an estimated value $S_1(t-\Delta t)$ corresponding to the signal to be demodulated $S(t-\Delta t)$, which latter can differ substantially from $S(t)$.

To effect proper mixing of the signals, it is therefore necessary that correcting networks be provided in demodulators of the type hereinbefore described, which in association with the feedback modulator, should provide from the signals which they receive (these being derived from the signals $S(t-\Delta t)$ ) an estimated value $S_1(t)$ corresponding to the signal $S(t)$. In other words, the correcting network must "predict" from the information it gains from the signal $S(t-\Delta t)$, the signal $S(t)$ which will be applied to the demodulator at the instant $t$.

Although the predicting function thus desired of the correcting network considered, would appear paradoxical, it will be shown in detail hereinafter that if the modulating signal is considered as being the result of a "stochastic process" it is possible to build a "predicter" network which, making use of the correlative properties of the said modulating signal, yields an approximate estimation of its future value.

It will likewise be shown that there is an inevitable incompatibility between the operation to be carried out by the filter network in the demodulation circuit and the predicting action of the predicter network mentiond above, the net result of which is to reduce the efficiency of the whole system.

The system of the invention also comprises a mixer (or frequency changer) having first and second inputs and an output, circuit means including a delay network for applying the received wave to be demodulated to said first input, means for applying an auxiliary frequency-modulated wave derived from said received wave to said second input, a bandpass filter receiving the output of said mixer and a frequency discriminator fed from the output of said filter and feeding demodulated signals to a utilization circuit. However, it differs from the conventional systems in that said auxiliary wave is directly derived from the received wave by an auxiliary circuit not including any feedback loop and the operation of which will be explained hereinbelow.

The just mentioned auxiliary wave constitutes what will be hereinafter referred to as "the approximate signal" or "the estimated signal."

The demodulator of the invention thus overcomes the above-explained drawbacks by getting rid of the predicter network, thanks to the fact that signal estimation is no longer effected by means of a feedback loop. Consequently, the signal-to-noise ratio is ultimately improved since the efficiency of the filter network following the mixer is no longer limited by the incompatibility between such efficiency and prediction.

In the circuit of the invention, the approximate signal $S_1(t-\Delta t)$ is obtained by a straightforward procedure from the signal S($t$) to be demodulated. The completion of the approximate signal $S_1(t-\Delta t)$ is carried out in an estimating network preceding the demodulating circuit proper. This estimating network, into which the signal S($t$) and associated noise elements are injected, comprises a device hereinafter designated as a "short-term spectral analyzer" which yields an estimation of the instantaneous frequency of the signal to be demodulated.

This analyzer, which will be described in greater detail hereinafter, comprises a plurality of damped resonant circuits the natural frequencies of which are staggered in the frequency band occupied by the received frequency modulated signals, preferably with spacings substantially equal to the highest frequency in the modulating signal. These resonators are simultaneously excited by the frequency modulated signal which it is desired to demodulate. At a given instant, there exists one of them which produces at its terminals an output signal the amplitude of which is higher than those at the output terminals of all other resonators. Given adequate damping, the rank number in the scale of the resonator concerned is mainly determined by the instantaneous frequency of the signal at the instant considered. When at its particular terminals, the signal of highest amplitude is developed, amplitude-selective means cause the corresponding resonator to control a D.C. voltage generator the output voltage of which is proportional to the rank number of the said resonator in the scale of the natural frequencies. The latter D.C. voltage constitutes an estimation of the modulating signal.

An estimation of the frequency modulated signal to be demodulated is then obtained from the estimation of the modulating signal by causing the latter to frequency-modulate a local oscillator. The so-obtained auxiliary frequency-modulated wave is applied to the second input of a mixer belonging to the demodulating device proper.

Self-evidently, since the formation of the approximate signal $S_1(t-\Delta t)$ by the estimating network requires a certain time $\Delta t$, it is not the signal to be demodulated S($t$) which should be applied to the mixer but the signal $S(t-\Delta t)$ which latter is obtained quite easily with a standard delay line.

Following the mixer, normal filtering and demodulating circuitry is provided.

However, in the device of the invention, the demodulation product from the said circuitry consists (save for the noise) of the difference between the modulating signal itself and its estimated value. This difference is not, as is the case of frequency feedback demodulators, proportional (in the absence of noise) to the modulating signal. Therefore, to obtain the latter signal itself it is necessary to add to the demodulated product mentioned above, the estimated value of the modulating signal corresponding to $S_1(t-\Delta t)$, which latter is combined with the said product by means of an adding network.

The invention will be better understood from the hereinafter given detailed description, made with reference to the attached drawings, of which:

Before describing the invention proper and for a better understanding of its mode of operation and of the improvement associated therewith, an analysis of the operation of the conventional feedback frequency compression demodulator will first be given, with reference to FIGURE 1.

*Analysis of the operation of the conventional frequency compression demodulator*

Figure 1:
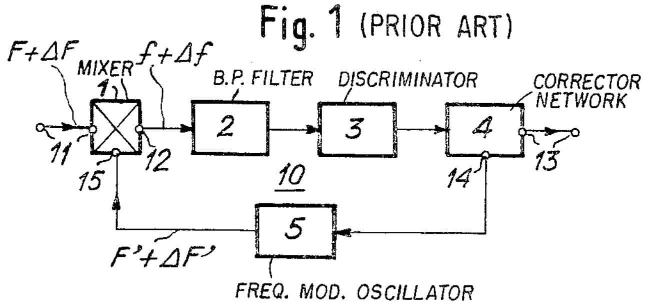
Fig. 1 (PRIOR ART)
FIGURE 1 shows a block diagram of one of the previously known demodulators for demodulating F.M. signals; this is shown by way of example.

FIGURE 1 shows, by way of example, the block diagram of a demodulator of known type for F.M. signals. This demodulator as a unit, carries the reference number 10.

The F.M. signal which it is desired to demodulate is applied to the terminals 11 of a mixer network 1, which likewise receives, at its terminals 15, the signal coming from the output of the demodulator after remodulating in the frequency-modulated local oscillator 5 situated in a feedback loop.

At the output terminals 12 of the mixer 1, a mixture of signals appears which, after passage through a bandpass filter 2, is demodulated by a discriminator 3 of standard type. The demodulated wave issuing from the discriminator 3 is applied to the input of a corrector network 4 one of whose pairs of output terminals 13 constitutes the output from the demodulator 10, its other pair of output terminals 14 being connected to the input of a frequency modulator included in 5 and situated, as already explined, in the feedback loop.

A rough analysis of the operation of the circuit 10 will be made assuming that the wave to be demodulated has a slowly varying frequency.

Let,

F be the carrier frequency of the signal to be demodulated which is applied to the terminals 11 of the mixer 1, F′ be the zero modulation or "carrier" frequency of the signal issuing from the oscillator 5 and applied to the terminals 15 of the mixer 1, ΔF be the frequency deviation of the signal to be demodulated, ΔF′ be the frequency deviation of the signal issuing from the oscillator 5.

The bandpass filter 2 has a dual function:

(1) It eliminates those components of the mixture of signals which issue from the terminals 12 of the mixer 1, other than the one selected. In order to have something concrete to work with, the frequency of this component will be assumed equal to:

$$f=F-F'$$

(2) In the presence of noise, it eliminates, as far as possible, the noise outside the band of frequencies occupied by the input signal in the said filter 2.

The discriminator 3 which receives at its input a wave of frequency $f+\Delta f$, produces a voltage proportional to the frequency deviation $\Delta f$.

The corrector network, whose special role will be more particularly described hereinafter, is designed to transmit a continuous or slowly varying component and supplies to the modulator 5, via the terminals 14, a voltage proportional to the frequency deviation $f$. The frequency deviation ΔF′, at the output of the modulator 5, is thus likewise proportional to the frequency deviation $\Delta f$:

$$F'=K\cdot\Delta f' \quad (1)$$

K being a constant.

Further, since $F=(F'+f)$, the frequency deviation ΔF of the wave to be demodulated is also proportional to the frequency deviation $\Delta f$:

$$F=(K+1)\cdot\Delta f \quad (2)$$

The result is that:

The signal which appears at the output terminals of the demodulator 10 has an amplitude proportional to the frequency deviation ΔF of the signal to be demodulated;

The frequency deviation of the signal issuing from the filter 2 is reduced in the ratio $(K+1)$ compared with the frequency deviation of the signal to be demodulated applied to the input terminals of the demodulator 10.

If the wave to be demodulated is no longer assumed to have a slowly varying frequency, an understanding of the functioning of the demodulator 10 is less easy to obtain.

If we assume that the relation $\Delta F=(K+1)\Delta f$ is still valid, it will be seen that it is possible, by choosing K sufficiently large, to conveniently reduce the frequency deviation and, as a consequence, the modulation index of the signal wave issuing from the mixer 1 at the terminals 12 so that the band of uesful frequencies occupied by the spectrum of the said wave is reduced to twice the basic frequency band of the modulating signal, which band has a width equal to the highest frequency in the said modulating signal.

Thus, the most efficient protection against noise is obtained by limiting to this value the width of the band of frequencies transmitted by the filter 2.

However, the relation $\Delta F=(K+1)\Delta f$ cannot be satisfied unless the delay introduced by the loop situated between the terminals 12 and 15, is negligible. This condition will now be examined in detail.

It is evident that the filter 2 introduces an unavoidable delay and that, moreover, it has a sharp cut-off. The demodulation product supplied at the instant $t$ by the discriminator 3 therefore does not have an amplitude which is proportional to the instantaneous frequency spacing of the signal issuing from the mixer 1 at the same instant $t$. In other words, the demodulation product supplied at the instant $t$ by the discriminator, has a voltage proportional to the instantaneous frequency deviation of the wave which issued from the mixer 1 at the prior instant $(t-\Delta t)$, $\Delta t$ being largely due to the delay introduced by the filter 2.

The purpose of the corrector network 4 provided at the output of the discriminator 3 now becomes apparent, since, without its help, the relation $\Delta F=(K+1)\Delta f$ could not be satisfied and the advantages described, i.e. reduction in the band occupied with a consequent filtering-out of noise within a narrow band, together with the production, at the demodulator output, of a voltage proportional to the instantaneous frequency deviation of the signal to be demodulated applied to its input, can no longer be obtained. Again, it will be apparent that where the constant K and the delay $\Delta t$ are sufficiently large, the demodulator can become unstable.

Thus the function of the corrector network 4 appears to be paradoxical since it consits in compensating the effect of a delay and therefore in supplying, at the input terminals of the modulator 5 in the feedback loop, a voltage whose value constitutes anticipation of the signal which, issuing from the discriminator 3, is applied to the input terminals of the said corrector network 4. Although this operation is obviously impossible in a strictly determined sense, it is nonetheless true that, considering the modulating signal to be the result of a "stochasitc process," it is possible to physically determine an electrical network capable of providing an estimation of the future value of the said modulating signal. This estimation, known as a "prediction" furnished by such an electrical network, known as a "predicter," is based upon the correlative properties of the modulating signal.

Self-evidently, such estimation is the more accurate the nearer the instant at which it is carried out to the present. In this respect, reference may be made to the theory by Norbert Wiener disclosed in his book entitled "Extrapolation, Interpolation and Smoothing of Stationary Time Series," 1949, edition published by John Wiley and Sons, New York.

It is known that to characterize the correlative properties of a real function of time S($t$), the auto-correlative function R($\gamma$) of the said function is defined by the relation:

$$R(\tau)=\lim_{T\to\infty}\frac{1}{T}\int_0^T S(t)\cdot S(t+\tau)dt \qquad (3)$$

If the time function considered S($t$) is the result of a "stochasitc ergodic" process, the auto-correlative function R($\gamma$) associated with S($t$), is equal, with a probability of unity, to the "function of auto-covariance," itself deduced, in accordance with the Wiener-Khintchine theorem, from the "energy image density" G($f$), by means of Fourier transforms. (Vide for instance D. Middleton, "An Introduction to Statistical Communication Theory," McGraw Hill & Co., New York, 1960, pages 141 to 152.)

It is to be noted that in the term stochastic ergodic process, the stochasitc process is such that the statistical properties of its dfferent possible realizations at a given instant are the same as the statistical properties of the whole of the values successively taken in time by any one of the said realizations.

It is also noted that one can define the power spectrum or the spectral density $G(f)$, of a process S($t$), regarded for instance as an electrical signal, as being the average, throughout the whole of its possible realizations, of the time-averaged power dissipitated in a unit resistance and in a unit frequency band by the said electrical signal.

The relationships established in accordance with the Wiener-Khintchine theorem, between the auto-correlative function R($\gamma$) and the energy spectrum density G($f$) of one and the same ergodic process, are therefore:

$$R(\tau)=\int_0^\infty G(f)\cdot\cos\ (2\pi f\tau)\cdot df \qquad (4)$$

$$G(f)=\int_0^\infty R(\tau)\cdot\cos\ (2\pi f\tau)\cdot d\tau \qquad (5)$$

The correlation time T of a signal S($t$) is the time interval $t$ beyond which the correlation R(T) between S($t$) and $S(t+T)$ can be considered negligible.

The Wiener-Khintchine theorem and the properties of Fourier transforms show that the inequality of the correlation times for two signals introduces a reverse inequaltiy in their bandwidths.

The estimation of the future value of a signal evidently not being possible with acceptable accuracy unless such anticipation is considered for a time interval much shorter than the correlation time of the said signal, it is obvious that there is inevitable incompatibility between the filtering operation of the filter 2 and the predicting operation of the predicter 4. That is to say, whilst we require the filtering operation to be as efficient as possible, the predicting operation is not sufficiently accurate unless the delay introduced by the filter 2 is very short.

In demodulators of known type which have been effectively used, in general, designers have made do with a simple circuit for the filter 2 at the cost of protection against noise.

Besides this basic limitation on the performance of such demodulators, they entail other drawbacks:

(1) Their operation requires a high degree of linearity in the modulation effected in 5, which, in multiple-channel telephone equipment for wide frequency band work, is generally not feasible until the signals be frequency-translated in the microwave band, the modulator used then operating a klystron.

(2) The adjustment of the feedback loop, and especially of the corrector network 4, is critical, making these demodulators difficult to operate.

However, it is worth noting that with such demodulators there has been experimental confimation of a reduction in the reception threshold.

In order to obtain a better understanding of the operation of the demodulator forming the object of the invention, the protection against noise afforded by demodulators of the type represented in FIGURE 1 will now be examined.

Let:

$S(t)$ be the signal to be demodulated applied to the input terminals 11 of the mixer 1, $N(t)$ the noise inherent in this signal, likewise applied to the input terminals 11, $S_1(t)$ the signal applied to the terminals 15 of the mixer 1

If it is provisionally assumed that no frequency transposition occurs, then at the output 12 of the mixer 1, we obtain a time function of the form:

$$[S(t)+N(t)]S_1(t)=S(t)\cdot S_1(t)+N(t)\cdot S_1(t) \quad (6)$$

The integration of this time function gives:

In the case of the first term, a result similar to the autocorrelation of the signal $S(t)$ for zero time displacement i.e. R(O) is proportional to the signal energy, and In the case of the second term which comprises two non-correlative factors, a result which tends towards zero if the period of integration tends towards infinity.

Physically, it is impossible to carry out integration in the strict sense of the word and the only thing to be done is to perform an operation equivalent to the action of a low-pass filter. In point of fact, the signals $S(t)$ and $S_1(t)$ are not identical and the spectrum of the signal obtained at the output of the mixer 1 has a bandwidth which, as a general rule, cannot be reduced below the basic frequency band of the modulating signal.

The action of the low-pass filter can, however, be represented by the integration of the expression (6) multiplied by a time weighting function which is simply the pulse response of the low-pass filter concerned.

The time interval during which this weighting function retains a non-negligible value is of the same order of magnitude as the correlation time of the modulating signal, which latter is longer than that of the noise in the frequency band occupied by the modulated signal; thus it will be evident that the response of the low-pass filter depends largely on the useful term $S(t)\cdot S_1(t)$, and the effect of the noise term $N(t)\cdot S_1(t)$ is reduced.

In the case where frequency transposition does take place, as in the demodulator of FIGURE 1, the low-pass filter considered in the case where no such transposition was assumed is replaced by a bandpass filter of twice the basic bandwidth of the modulating signal; however, the reasoning still holds good.

The result of the demodulation, by the discriminator 3, of the product $S(t)\cdot S_1(t)$, after filtering by the filter 2, is proportional to the instantaneous frequency deviation of the useful signal to be demodulated $S(t)$ and of the value $S_1(t)$ estimated by the predicter. From the relation (2) above, assuming perfect operation of the loop and in the absence of noise, this deviation is proportional to the spacing between the instantaneous frequency of the useful signal and the central frequency of the band it covers. The result of the operation is thus demodulation. Again, as has been shown, this operation reduces the noise term with respect to the useful term.

*Mode of operation of the demodulator of the invention*

As already mentioned, in the demodulator of the invention, the signal to be demodulated is mixed with a signal resulting from a local estimation of the said signal to be demodulated, this enabling greater protection against noise to be obtained. However, the estimated signal is not obtained using a feedback loop and the filtering efficiency after mixing is not limited, as is the case in loop demodulators of the known art, by the incompatibility between efficient filtering and sufficiently exact prediction.

The basic idea of the invention is to split the demodulation process into two stages:

(a) the first stage consists in obtaining an estimation $S_1(t-\Delta t)$ which approximates sufficiently closely to the received modulated wave, $\Delta t$ being the necessary time for the formulation of such estimate:

(b) the second stage is constituted by demodulation proper of the wave $S(t)$ to be demodulated, this being conveniently delayed by a delay network (and thus being converted to the form $S(t-\Delta t)$) and then mixed with its estimated value $S_1(t-\Delta t)$.

The first stage is put into effect using a short-term spectral analyzer the action of which is equivalent not to the analysis of a signal spectrum in the standard sense but to the spectral analysis of this signal multiplied by a weighting function the duration of which is in the order of magnitude of the correlation time of the modulating signal. Under these conditions, the resulting signal from this operation is caused to vary in time, in step with the instantaneous frequency of the received wave, and can therefore be considered as an approximate evaluation of the latter.

The functioning of the short-term spectral analyzer can be explained as follows:

F being the carrier frequency of the useful F.M. modulated received wave and $\Delta F$ being the corresponding maximum frequency deviation, we consider $n$ resonant circuits the natural frequencies of which, preferably staggered at regular intervals, are located within the frequency interval $(F-\Delta F, F+\Delta F)$. In other words, the natural frequencies of these $n$ resonators sub-divide the interval $2\Delta F$ into $n$ equal parts, the $p$th resonator having the natural frequency $F+(2p-n)\Delta F/n$. The spacing between the natural frequencies of two adjacent resonators is given a value in the same order of magnitude as the basic frequency bandwidth $b$ of the modulating signal.

In addition, it is assumed that all the resonators simultaneously receive at their input terminals, via a convenient separator circuit, the same F.M. signal.

If these resonators had very low damping, the voltages which appear at their terminals would have amplitudes largely independent of time and which would be characteristic of the spectrum of the F.M. signal.

However, in point of fact, these resonators are chosen with comparatively high damping and, more precisely, with time constants in the order of magnitude of the correlation time of the modulating signal; the voltage amplitude values at their terminals thus are no longer independent of time. At a given instant, one of the resonators will develop across its terminals a voltage amplitude larger than those of all the others, the rank number of this resonator in the $n$ resonator assembly being dependent upon the instantaneous frequency of the received wave at the instant concerned. This action by the device can be described as a short-term spectral analysis, permitting an estimation of the instantaneous frequency of the F.M. signal it is desired to demodulate.

Figure 2:
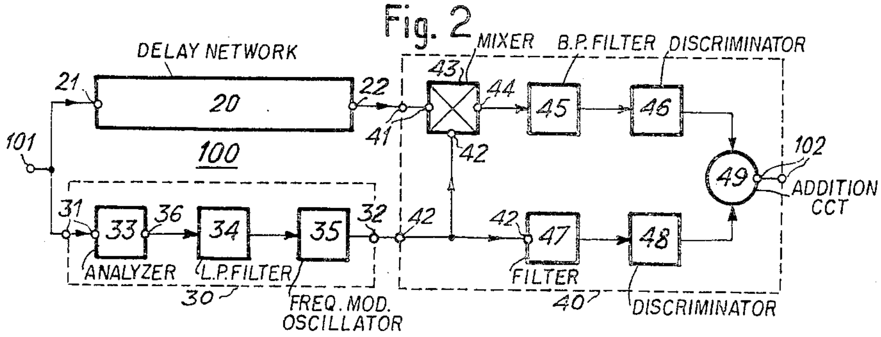
FIGURE 2 shows in block diagram form the fundamental circuit of a demodulator for F.M. modulated signals, in accordance with the invention.

Coming now to the description of the devices of the invention, FIGURE 2 illustrates a first variant form of the block diagram of a demodulator in accordance with the said-invention, for F.M. signals.

At the input 101 of the demodulator 100, the signal to be demodulated $S(t)$ passes to two parallel channels.

On the one hand this signal is applied to the input 31 of an "estimating network" 30 comprising three parts arranged in series, i.e. a short-term spectral analysis network 33 to be described in detail later, a low-pass filter 34 for smoothing the signal issuing from the network 33 and a frequency modulator and local oscillator 35. This network produces at its output 32 a delayed and frequency transposed estimation $S_1(t-\Delta t)$ of the signal $S(t)$ applied to the input 31.

On the other hand, this same signal is applied to the input 21 of a delay line 20 of standard type, where it is delayed by the time $\Delta t$. In other words, at the output 22 of the delay line 20, the signal $S(t-\Delta t)$ appears.

The two signals $S_1(t-\Delta t)$ and $S(t-\Delta t)$ then pass into the part 40 of the demodulator 100 where demodulation proper is carried out. The signal $S(t-\Delta t)$ is applied to one of the inputs of a mixer 43 and the signal $S_1(t-\Delta t)$ to the other input 42 of the same mixer. The mixed product appears at the terminals 44.

The central frequencies of the signals $S(t)$, $S_1(t)$ and of the mixer output product are respectively designated as F, F' and $f$, and are connected by the same relation as given in the case of the known demodulator shown in FIGURE 1, i.e.:

$$f=F-F'$$

If the estimation made by the network 30 were perfect and if there were no noise, the frequency of the mixed product at the terminals 44 would be constant and equal to the difference $f$ between the central frequencies of the signal received $S(t)$ and the estimated signal $S_1(t)$. Since, in fact, there is some separation between the modulating signal and its estimated value, the signal obtained at the output of the mixer 43 is frequency modulated but only to the extent of this separation or spacing, this being small with respect to the modulating signal. There is thus a reduction in the modulation index. The signal produced by the mixer can then be filtered in a bandpass filter 45 whose bandwidth is about twice the basic frequency band $b$ of the modulating signal.

At the output of the filter 45, the wave is demodulated by a discriminator 46 of standard type. The result of this demodulation is exclusively the difference between the modulating signal itself and its estimated value as given by the network 33. To obtain the signal itself, to this difference must be added the estimated value of the modulating signal derived from the estimation of the F.M. signal $S_1(t-\Delta t)$ taken from the output terminals 32 of network 30, filtered in the filter 47 and demodulated in the discriminator 48. The estimated modulating signal is then applied to the adding network 49 at the same time as the signal issuing from the discriminator 46.

The output terminals 102 of this adding network 49 are likewise the output terminals of the part 40 of the demodulator 100.

Self-evidently, the delay produced by the filter 47 and the discriminator 48, as well as the electrical characteristics of these two networks, should be identical (save for the frequency spacing) with those of the filter 45 and the discriminator 46.

Figure 3:
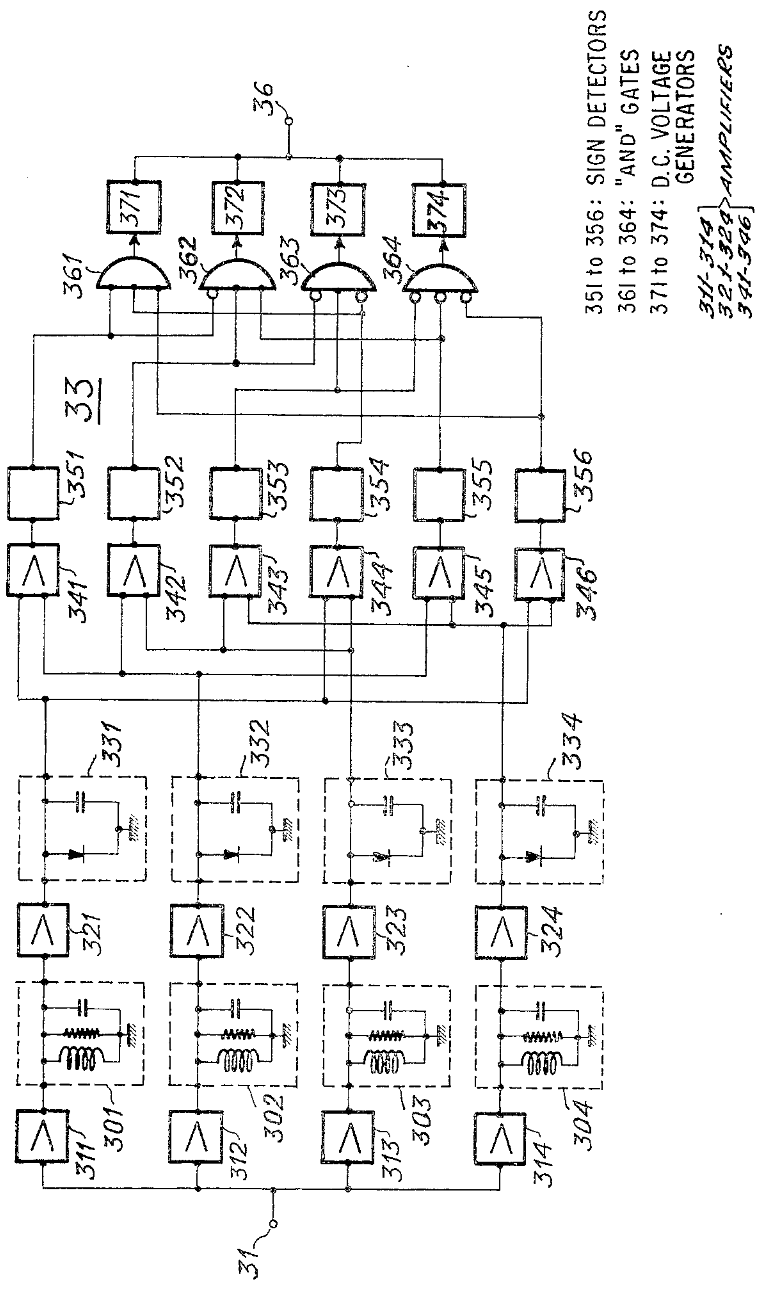
FIGURES 3, 4 and 5 show block diagrams of three variant forms of the short-term spectral analyzer, included in the device of the invention.

FIGURE 3 shows the block diagram of a first embodiment of the short-term spectral analyzer. In this figure, only four resonant circuits 301–304 have been shown but this is in no way limitative and has simply been chosen to keep the drawing simple.

The signal to be demodulated, applied to the input terminals of the analyzer 33, is applied in parallel to the inputs of the four amplifiers 311–314, these acting as current injectors. At the outputs of these amplifiers, the resonant circuits 301–304 are respectively connected. As stated above, the spacing between the natural frequencies of these resonant circuits is in the same order of magnitude as the basic frequency band $b$ of the modulating signal. It is convenient, however, that the assembly of these resonant circuits cover a total bandwidth approximately equal to $2\Delta F$. If there are $n$ resonators of bandwidth $b$, the two extremes of which are centered at $(F-\Delta F)$ and $(F+\Delta F)$, we should have:

$$(n-1)b=2\Delta F$$

from which $$n=2m+1$$

where $m=\Delta F/b$ is the modulation index of the F.M. signal received. In the example in point, it is therefore assumed that $2\Delta F=3b$, that the modulation index is equal to 1.5, the resonant or natural frequencies of the resonant circuits 301–304 being respectively approximately:

$$\left(F-\frac{3}{2}b\right)\quad\left(F-\frac{1}{2}b\right)\quad\left(F+\frac{1}{2}b\right)\quad\left(F+\frac{3}{2}b\right)$$

and their 3 db-attenuation bandwidth being approximately equal to $b$.

The voltages which appear at the terminals of the resonant circuits 301–304, are amplified by amplifiers 321–324 and subsequently detected in detector networks 331–334.

The voltages obtained at the terminals of the detectors 331–334 are applied two by two to the inputs of the differential amplifiers 341 to 346 which serve to compare two at a time the D.C. voltages issuing from the detector networks. For example, comparison between the voltage issuing from 331 and that issuing from 332 is done by the amplifier 341, between the voltage issuing from 331 and that issuing from 333 by the amplifier 344 and between the voltage issuing from 331 and that issuing from 334 by the amplifier 346 and so on.

Obviously, for $n$ resonant circuits, $$n\frac{(n-1)}{2}$$

differential amplifiers are required.

The differential amplifiers 341 to 346 are followed by sign detectors 351 to 356 of standard type. At the outputs of these, signals are obtained which comprise binary variables indicating that at the inputs to a given differential amplifier one of the signals applied has an amplitude higher or lower than the other.

The outputs of these fixed sign detectors are connected to a set of four "AND" gates having three inputs 361 to 364 of the type currently used for electronic switching purposes. The connection between the sign detectors and the gates is made in such a manner that only one of the four is conductive, the others staying closed. The rank number of the conductive gate corresponds to that of the detector in the group 331 to 334 at whose output the highest voltage appears.

In the case illustrated in FIGURE 3:

The sign detector 351 is connected to one of the inputs of the gate 361 and, with inhibiting action, to one of the inputs of the gate 362;

The sign detector 352 is connected to one of the inputs of the gate 362 and, with inhibiting action, to one of the inputs of the gate 363;

The sign detector 353 is connected to one of the inputs of the gate 363 and, with inhibiting action, to one of the inputs of the gate 364;

The sign detector 354 is connected to one of the inputs of the gate 361 and, with inhibiting action, to one of the inputs of the gate 363;

The sign detector 355 is connected to one of the inputs of the gate 362 and, with inhibiting action, to one of the inputs of the gate 364;

The sign detector 356 is connected to one of the inputs of the gate 361 and, with inhibiting action, to one of the inputs of the gate 364.

Each of the gates 361–364 controls a D.C. voltage generator 371–374, for example by saturating a transistor which is blocked when no control is applied. The D.C. voltage values thus produced are equally spaced; one of them may be zero, thus permitting one of the generators to be cut out.

The output terminals of the generators 371 to 374 are connected in parallel to the output terminals 36 of the analyzer 33. At this output 36, appears the D.C. voltage of that generator associated with a conductive gate; this means that at the said output 36, a stepped voltage is obtained, each step representing the rank number of that of the resonators 301–304 whose voltage amplitude is higher than those of the others at the particular instant.

Figure 4:
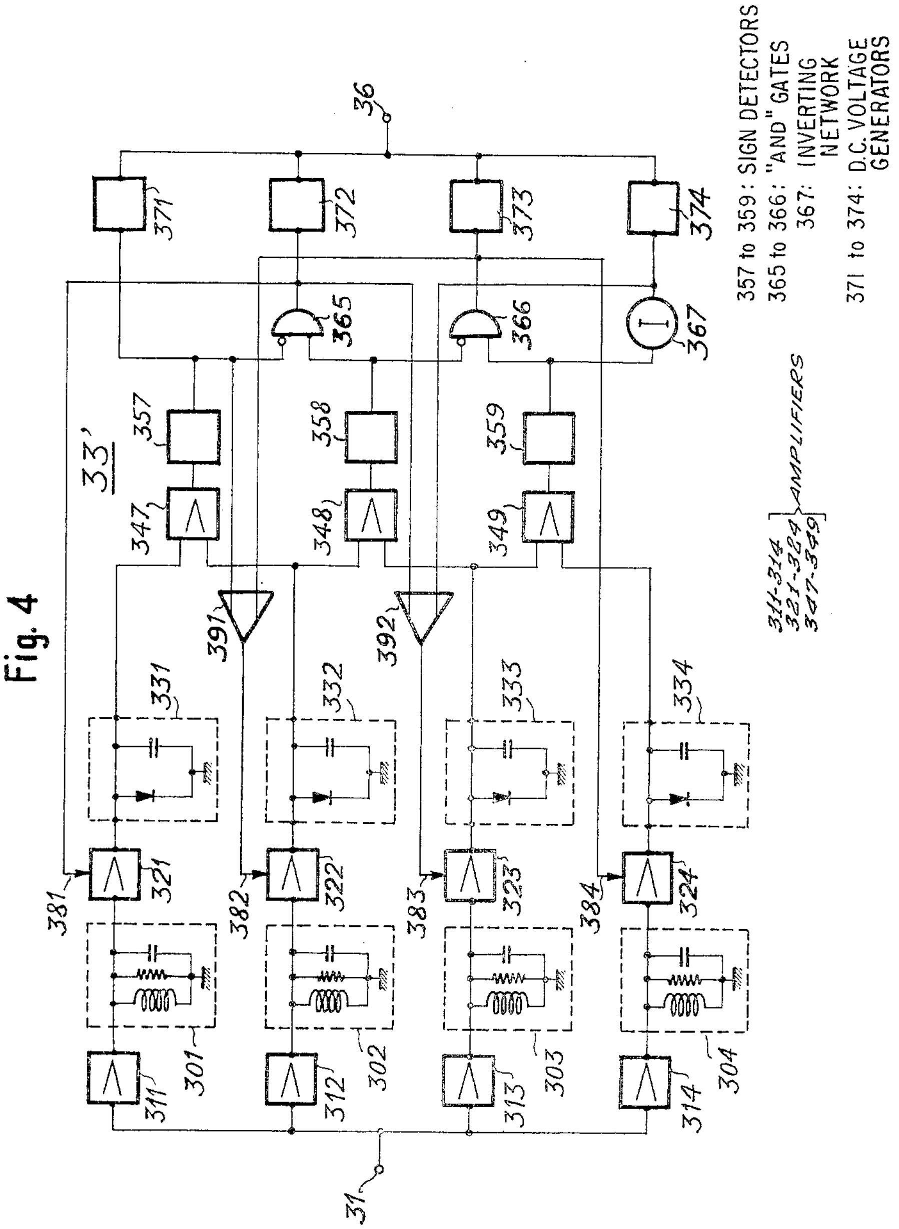

FIGURE 4 shows a block diagram of a second variant of the short-term spectral analyzer 33'. The circuit of FIGURE 4, which is simpler than that of FIGURE 3, was designed from the following considerations.

The modulating signal being a continuous time function, the instantaneous frequency of the F.M. signal is likewise a continuous function. This means that the resonators go into resonance one after the other in order. If, for example, the resonator of order $p$ is resonant at a given instant, the only other resonators which can go into resonance at the following instant are the $(p-1)$th or the $(p+1)$th ones.

In FIGURE 4, likewise four resonant circuits 301–304, are considered.

The part of the analyzer of FIGURE 4 comprised between the input 31 and the outputs of the detectors 331–334 is identical with the corresponding part of the analyzer shown in FIGURE 3. However, the amplifiers 321–324 in FIGURE 4 are normally blocked, such blocking being removable by means of control signals applied to the amplifiers via connecting wires 381–384.

The detection networks 331 to 334 are connected to the inputs of the differential amplifiers 347–349 in such a manner that two adjacent detection networks are connected to the two inputs of one and the same differential amplifier. The four output voltages of the detection networks 331–334 are no longer compared two by two in all possible combinations, the sole comparisons now being between the output voltages 331 and 332, 332 and 333, 333 and 334. For $n$ resonators, the number of differential amplifiers is no more than $(n-1)$ whilst for the variant form of FIGURE 3, there were $n(n-1)/2$ such amplifiers.

The differential amplifiers 347 to 349 have their output terminals connected to the sign detectors 357 to 359. At the output from these latter, there appears in binary form the result of the comparison between the output voltages of the adjacent detection networks (taken two at a time) 331 to 334.

The sign discriminator 357 feeds into:

The control input of the D.C. voltage generator 371 identical with its counterpart in FIGURE 3, In inhibiting fashion, an input to the AND gate 365, One of the inputs to the OR gate 391 the output of which is connected to the connecting wire 382 controlling the amplifier 322.

The sign discriminator 358 feeds into:

An input of the AND gate 365,

In inhibiting fashion, one of the inputs of the AND gate 366.

The sign discriminator 359 feeds into:

One input of the AND gate 366,

An inverting network 367.

The AND gate 365 feeds into:

The D.C. voltage generator 372 identical with its counterpart in FIGURE 3;

The control wire 381 of the amplifier 321,

One of the inputs of the OR gate 392 the output of which is connected to the control wire 383 of the amplifier 323.

The AND gate 366 feeds into:

The D.C. voltage generator 373 identical with its counterpart in FIGURE 3,

One of the inputs of the OR gate 391,

The control wire 384 and the amplifier 324.

The outputs of the D.C. voltage generators 371 to 374 are connected in parallel to the output terminals 36 of the analyzer 33'. The voltages supplied by the generators 371–374 are staggered in the same way as those of their counterparts in FIGURE 3. One of these voltages can be zero.

The connection of the outputs of the sign detectors 357 to 359 to the inputs of the D.C. voltage generators 371 to 374 through the AND gates 365 and 366 and inverter 367, is such that the generator controlled is the one corresponding to that of the detection networks 331 to 334 detecting the signal of highest amplitude.

The purpose of the blocking, in the quiescent state, of the amplifiers 321 to 324 and of the connections 381–384 controlling these amplifiers, is to ensure that only one of the generators 371 to 374 operates at any given instant and that the voltages detected appear exclusively at the terminals of those detection networks 331 to 334 which are adjacently situated to that of their number which yields the highest amplitude, this in order to permit development within the system when the rank number of the resonator yielding the highest amplitude changes. Under these conditions, making a "previous acquisition" at the possible expense of a short interruption of operation, the signal at the input terminals 36 is identical with that obtained with the device in accordance with FIGURE 3.

Figure 5:
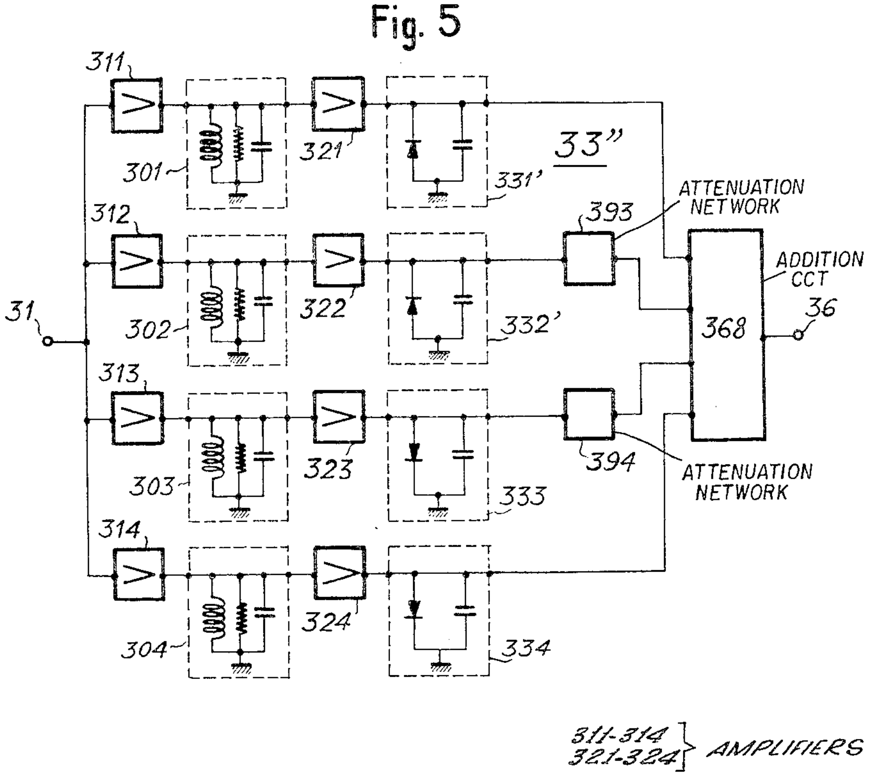

FIGURE 5 shows the block diagram of a third variant form of the short-term spectral analyzer 33''.

In the preceding variant forms, the analyzer comprises means of determining the rank number of the resonator whose amplitude is, at a given instant, higher than those of the other resonators. A D.C. generator whose rank number corresponds to the said resonator of highest amplitude is then made operative and at the output of the analyzer a stepped signal is obtained, this being smoothed by the filter 34 before being applied to the frequency modulator 35.

An essentially similar result can be obtained not by controlling auxiliary D.C. generators such as 371–374, but using the voltages resulting from detection of the voltages appearing at the terminals of the resonators. For this, all that is necessary is to multiply the voltages at the terminals of the detectors by coefficients linearly dependent upon the rank number of the detectors and to add all the voltages thus obtained. The resonator characteristics should be selected so as to obtain optimum smoothing.

Up to the detection networks connected to the output of the resonators, and including these latter, the analyzer of FIGURE 5 is identical in composition with that of FIGURE 3 but for the fact that the detection networks should, in the circuit of FIGURE 5, be connected so that the signals issuing from them are of positive polarity for the networks 331' and 332' and of negative polarity for the networks 333 and 334.

The detection networks 31' and 334 feed directly into the adding network 368. The detection networks 332' and 333 feed the adding network 368 via two resistant attenuators 393 and 394, of standard type. The two attenuators 393 and 394 are identical and divide the voltages applied to their inputs in the ratio 3:1. This means that at the output of the adding network 368, a voltage appears which, although a function of the rank number of the resonator whose voltage is highest, takes due account, by a process of linear weighting, of the ranks of the other resonators.

The signal issuing from 36 being in this case obtained by addition of the signals and not by the selection of one signal from several others, there is no point in providing the estimating network 33'' in FIGURE 5 with a smoothing filter 34. In this variant form, the output terminals 36 of the network 33'' are therefore directly connected to the input terminals of the frequency modulator and oscillator 35 shown in FIGURE 2.

The circuit of FIGURE 5 is nothing more than a discriminator having more than two tuned circuits. The advantage is thus derived, thanks to the fact that the resonators have relatively narrow frequency bands, of better protection against noise although this is obtained of course at the expense of linearity, which cannot be as good as that obtainable with two tuned circuits. In practice, a perfect signal is not required however since the networks considered are contributing to the building up of an approximate signal which will be ultimately corrected in the demodulation process proper effected in the section 40 of the demodulator.

Figure 6:
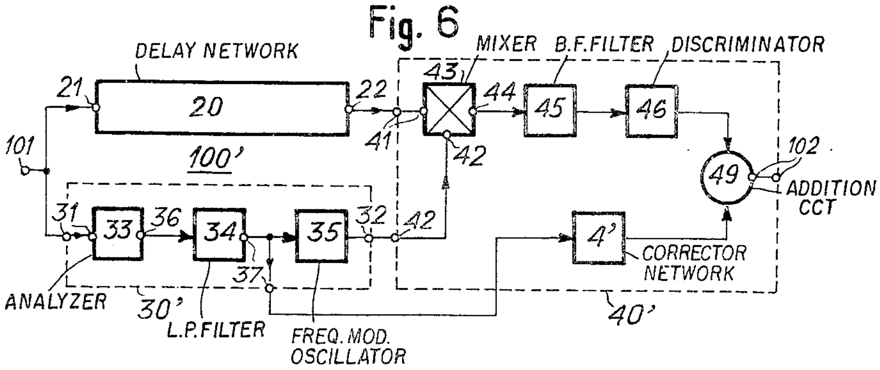
FIGURES 6, 7 and 8 show three variants of embodiment of the invention.

FIGURE 6 illustrates a variant form of the block diagram for the demodulator of the invention.

In this diagram, instead of tapping off the signal issuing from the estimating network 30' in order to filter it and frequency demodulate it before injection into the adding network 49, the signal issuing from the smoothing filter 34 in the estimating network 30' is used directly. The signal appearing across the terminals 37 of the filter 34 must then pass through a correction network 4′ before being injected into the adding network 49. This correcting network 4′, operative in a video frequency band, for instance, introduces a delay and corrects the amplitude of the signals it passes by means of amplification or attenuation.

However, the practical construction of a network of this sort is more critical than that of its apparently more complex counterpart of FIGURE 2.

Figure 7:
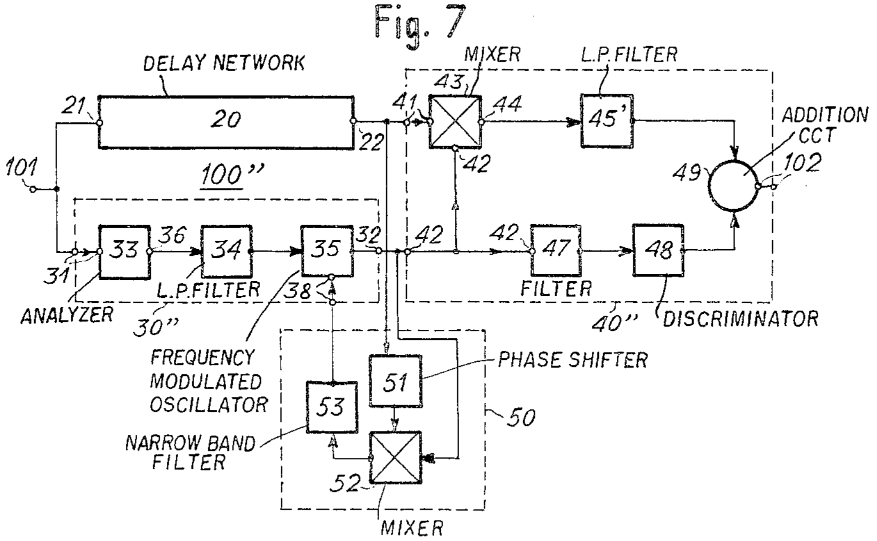

FIGURE 7 illustrates another variant form of the block diagram for the demodulator of the invention as shown in FIGURE 2. The demodulator as a whole carries the reference 100″, the estimating network the reference 30″ and the demodulation network itself the reference 40″. This variant form is employed in the case where the zero modulation frequency of the oscillator in 35 in the estimating network 30″ is equal to that of the received wave. In this case, the output 44 of the mixer 43 is connected to the input of a low-pass filter 45′ the output of which is connected to the adding network 49.

With this circuit, it is necessary to add a "phase-locking network" 50. This is because the approximative evaluation of the modulated signal made by the estimating network 30″ in no way guarantees that the phase difference of the signal supplied to the input terminals 41 and 42 of the mixer 43 is kept small, although this condition is esssential for the correct functioning, as a demodulator, of the said mixer 43.

This phase-locking action is obtained in standard fashion as follows:

The signal applied to the terminal 41 of the mixer 43 is phase-shifted through 90° with respect to the signal applied to the terminals 42 of the same mixer, this by means of the phase-shift network 51. The two signals thus treated are respectively applied to the two inputs of the mixer 52 known as a "synchronous demodulator." At the output of the latter, the voltage will be zero if the two signals applied to its inputs are exactly 90° out of phase, i.e. if the signals at 22 and 32 have identical characteristics but for a phase difference amounting to a multiple of 180°. The voltage at the output terminals of the mixer 52 therefore has the character of an "error voltage." It is used to alter the phase of the local oscillator comprising the frequency modulator 35 in the estimating network 30″. This error voltage is conveniently filtered by the filter 53 whose frequency band is much narrower than the fundamental frequency band of the modulating signal, this being for the purpose of eliminating the effect of the said modulating signal on the phase control of the frequency modulator 35. The voltage which appears at the output terminals of the filter 53 is applied, sign and amplitude being chosen accordingly, to the control terminals 38 of the frequency modulator 35.

Figure 8:
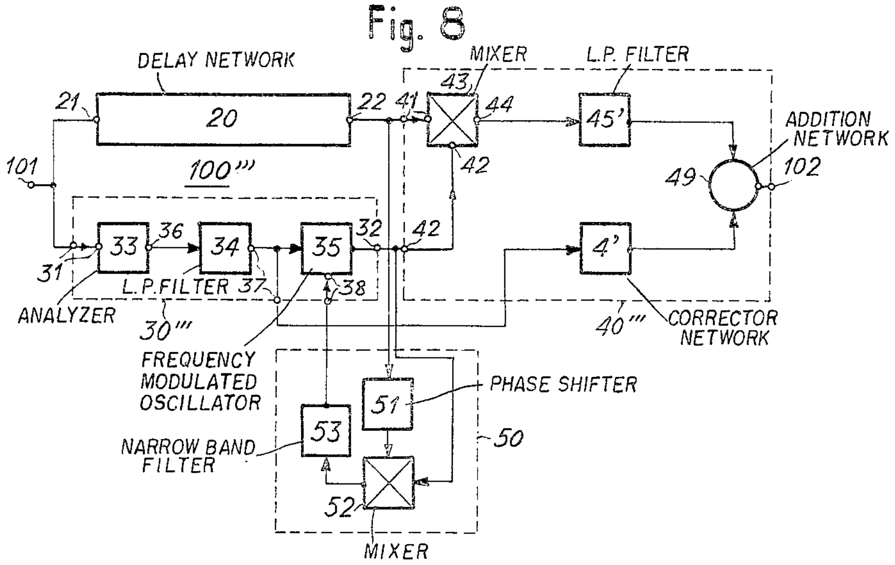

FIGURE 8 illustrates another variant from the block diagram for the demodulator of the invention as shown in FIGURE 2. The demodulator as a whole carries the reference number 100‴, the estimating network the reference 30‴ and the demodulating network itself the reference 40‴. This variant form is a combination of the two former ones illustrated in the FIGURES 6 and 7.

As can be seen in FIGURE 8, the demodulator comprises a low-pass filter 45′ and the phase-locking network 50 of FIGURE 7 as well as the correcting network 4′ of FIGURE 6.

Finally, referring again to the fundamental circuit of FIGURE 2, it will be mentioned that good results have been obtained from an experimental set-up, with the following numerical values, given only by way of example:

Received wave medium frequency: 70 mc./s.
Received wave maximum frequency: ±2.5 mc./s.
Local oscillator mean frequency: 105 mc./s.
Local oscillator frequency deviation: ±2.5 mc./s.
Middle frequency of bandpass filter: 35 mc./s.

Bandwidth of bandpass filter: 1 mc./s.
Basic band of modulating signal: 500 kc./s.
Number of resonators: 5 to 6
Bandwidth of each resonator at 3 db attenuation: 1 mc./s.
Resonator frequency spacing: 1 mc./s.
Delay time of delay network: 1 microsecond As it can be seen from the just given figures, an important feature of the invention is that the frequency deviation of the local oscillator is substantially equal to that of the received wave, contrarily to what is done in conventional frequency compression systems, where the former deviation is essentially smaller than the latter. Thus, if the modulating signal has a slow rate of variation and if, consequently, the instantaneous frequency of the oscillator is practically equal to that of this wave, a constant frequency appears at the output of the frequency changer, and no useful signal is received at the output of discriminator 46 of FIGURE 2. This makes it necessary to add to the demodulated signal from 46 another signal derived from the estimated signal delivered by 35 and proportional thereto, eventually after smoothing by a low-pass filter. The demodulated signal delivered at the output of the whole assembly thus results from the addition of a slow variation component from 48 (FIGURE 2) and from a rapid variation component from 46 (FIGURE 2).

It must also be understood that the above-described embodiments of the invention are by no ways the only possible ones, and that the analyzer means delivering the estimated signal might be built in a simpler form, for instance in the form of a conventional frequency discriminator followed by a low-pass filter, instead of a multiple resonator assembly. However, the hereinabove described method of building of such analyzer means is the preferred one, since its performance has been experimentally found to be superior enough to that of simpler systems to justify the use of a more complicated structure.

What is claimed is:

1. A demodulating circuit for a frequency-modulated wave, comprising a delay network having an input and an output, means for applying said wave to the input of said network, a frequency changing mixer having first and second inputs and an output, connection means between the output of said delay network and said first input of said frequency changing mixer, a local oscillator having an input and an output and adapted to be frequency-modulated by a control voltage, further connection means between the output of said oscillator and said second input of said frequency changing mixer; a passband filter having an input fed from the output of said frequency changing mixer, and an intermediate circuit fed from the output of said filter and delivering demodulated signals through a further circuit to a utilization circuit; an auxiliary circuit comprising analyzer means and having an input fed from said wave and an output delivering an estimated signal proportional to the mean value during a small time interval of the instantaneous frequency deviation of said wave from its zero-modulation frequency, said estimated signal constituting said control voltage, and means for applying said control voltage to said local oscillator and for adjusting the value of said control voltage such that the average frequency deviation of said local oscillator is substantially equal to that of the above-said wave; said further circuit being an addition circuit additively combining said demodulated signals with a further signal derived from said control voltage.

2. A demodulating circuit is claimed in claim 1, wherein said local oscillator has a zero-modulation frequency differing from the zero-modulation frequency of said wave, and wherein the difference between the latter said frequencies is substantially equal to the middle frequency of the passband of said filter.

3. A demodulating circuit as claimed in claim 2, wherein the bandwidth of said passband filter is substantially twice that of the modulating signal in said frequency-modulated wave.

4. A demodulating circuit as claimed in claim 2, wherein said intermediate circuit includes a frequency discriminator.

5. A demodulating circuit as claimed in claim 1, wherein said further signal is obtained from a further frequency discriminator fed from the output of said local oscillator.

6. A demodulating circuit as claimed in claim 1, wherein said further signal is derived from said control voltage through an amplitude correcting network.

7. A demodulating circuit as claimed in claim 1, wherein said control voltage is applied to said local oscillator through a low-pass filter.

8. A demodulating circuit for a frequency-modulated wave comprising a delay network, means for applying said wave to the input of said network, a frequency changing mixer having first and second inputs and an output, connection means between the output of said delay network and said first input of said frequency changing mixer, a local oscilator adapted to be frequency-modulated by a control voltage, further connection means between the output of said oscillator and said second input of said frequency changing mixer; a passband having an input filter fed from the output of said frequency changing mixer, and an intermediate circuit fed from the output of said filter and delivering demodulated signals through a further circuit to a utilization circuit; an auxiliary circuit comprising analyzer means and having an input fed from said wave and an output delivering an estimated signal proportional to the mean value during a small time interval of the instantaneous frequency deviation of said wave from its zero-modulation frequency, said estimated signal constituting said control voltage, and means for applying said control voltage to said local oscillator and for so adjusting the value of said control voltage that the average frequency deviation of said local oscillator be substantially equal to that of abovesaid wave; said further circuit being an addition circuit additively combining said demodulated signals with a further signal derived from said control voltage; and said analyzer means comprising a plurality of resonant circuits having their individual resonant frequencies so staggered in the frequency band covered by said wave as to cover a substantial part thereof, means for applying said wave to all of said resonant circuits, and selective circuit means for deriving said control voltage from the voltages respectively developed across the terminals of said resonant circuits.

9. A demodulating circuit as claimed in claim 8, comprising a plurality of rectifying detectors each respectively from the alternating voltage developed across each of said resonant circuits and each controlling through the rectified voltage it delivers a corresponding one of a plurality of direct-current voltage generators each delivering a corresponding direct-current voltage, and wherein said selective circuit means combine said corresponding voltages from said generators into said control voltage.

10. A demodulating circuit as claimed in claim 9, wherein each one of said different direct-current voltages is proportional in magnitude and sign to the difference between the resonant frequency of the corresponding resonant circuit and the zero-modulation frequency of said frequency-modulated wave.

11. A demodulating circuit as claimed in claim 9, wherein said selective circuit means operate on said direct-current voltages from said generators so as to derive said control voltage exclusively from the direct-current voltage delivered by that of said generators which corresponds to that of said resonant circuits across the terminals of which the developed alternating voltage has momentaneously the highest amplitude.

12. A demodulating circuit as claimed in claim 9, wherein said selective circuit means comprise a number of differential amplifiers each operated from a different permutation combination of two of said rectified voltages, and wherein the output voltages of said amplifiers control a plurality of electronic gates which in turn control the combination of said direct-current voltages into said control voltage.

13. A demodulating circuit as claimed in claim 9, wherein said selective circuit means comprise a number of differential amplifiers equal to that of said resonant circuits minus one, wherein each one of said differential amplifiers is controlled by two of said rectified voltages corresponding to two of said resonant circuits having adjacent frequencies, and wherein the output voltages of said amplifiers control a plurality of electronic gates which in turn control the combination of said direct-current voltages into said control voltage.

14. A demodulating circuit as claimed in claim 8, comprising a plurality of rectifying detectors respectively fed from the alternating voltage developed across each of said resonant circuits, wherein said selective circuit means include a weighting network combining the rectified voltages delivered by said detectors into said control voltage.

15. A demodulating circuit as claimed in claim 1 wherein said local oscillator has a zero-modulation frequency differing from the zero-modulation frequency of said wave, and wherein said passband filter has a middle frequency substantially equal to the difference between the latter said zero-modulation frequencies and a bandwidth substantially twice that of the modulating signal in said frequency-modulated wave.

16. A demodulating circuit as claimed in claim 8, wherein said local oscillator has a zero-modulation frequency differing from the zero-modulation frequency of said wave, and wherein said passband filter has a middle frequency substantially equal to the difference between the latter said zero-modulation frequencies and a bandwidth substantially twice that of the modulating signal in said frequency-modulated wave.

References Cited by the Examiner

UNITED STATES PATENTS 3,103,009 9/63 Baker ............ 325—475 X

HERMAN KARL SAALBACH, *Primary Examiner.*

ALFRED L. BRODY, ROY LAKE, *Examiners.*